United States Patent
Chang

(10) Patent No.: US 6,578,277 B1
(45) Date of Patent: Jun. 17, 2003

(54) MAGNETIC COMPASS

(76) Inventor: Gin-Sung Chang, No. 15, Lane 385, Kuang Ming Rd., Wu Jih Hsiang, Taichung Hsien (TW)

( * ) Notice: Subject to any disclaimer, the term of this patent is extended or adjusted under 35 U.S.C. 154(b) by 0 days.

(21) Appl. No.: 10/013,547

(22) Filed: Dec. 13, 2001

(51) Int. Cl.$^7$ .............................................. G01C 17/24
(52) U.S. Cl. ..................................... 33/355 R; 33/348
(58) Field of Search ....................... 33/272, 348, 348.2, 33/354, 355 R, 364; 362/23, 29, 30, 109, 119, 154, 253; D10/68

(56) References Cited

U.S. PATENT DOCUMENTS

| | | | | |
|---|---|---|---|---|
| 1,819,310 A | * | 8/1931 | Wilson | 33/348 |
| 2,237,963 A | * | 4/1941 | Hawks | 33/348 |
| 2,487,044 A | * | 11/1949 | Cude | 33/354 |
| 2,738,412 A | * | 3/1956 | Spencer et al. | 362/253 |
| 2,738,759 A | * | 3/1956 | Hardesty | 362/29 |
| 4,335,521 A | * | 6/1982 | Rutherford | 33/355 R |
| 4,899,453 A | * | 2/1990 | Bhat et al. | 33/348 |
| D369,982 S | | 5/1996 | Chang et al. | D10/68 |
| 5,749,150 A | * | 5/1998 | McDermott | 33/355 R |
| 6,145,209 A | | 11/2000 | Chang et al. | 33/355 R |
| 6,292,137 B1 | * | 9/2001 | Agnew et al. | 33/355 R |
| D462,020 S | * | 8/2002 | Chang | D10/68 |

* cited by examiner

Primary Examiner—G. Bradley Bennett
(74) Attorney, Agent, or Firm—Browdy and Neimark, P.L.L.C.

(57) ABSTRACT

A magnetic compass comprises a compass body, an illuminant, a battery set, a base, and a top lid. The compass body, the illuminant and the battery set are situated within the interior section of the base and, furthermore, the illuminant is positioned at one side of the compass body and its light is projected towards the peripheral walls of the compass body. As such, the compass body is illuminated at optimal efficiency and the magnetic compass of the present invention is effectively usable under low light conditions.

11 Claims, 5 Drawing Sheets ional magnetic compass, such as that in U.S. Pat. No. 6,145,209, consists of numerous structural components and requires complicated and, furthermore, precise assembly to complete, with the objective of achieving reading accuracy through a biconvex lens that magnifies compass rose graduations. In addition to utilization by the average layman in leisure activities, such magnetic compasses are used for military applications and issued to soldiers.

MAGNETIC COMPASS

FIELD OF THE INVENTION

The present invention relates generally to a magnetic compass, and more particularly to the magnetic compass having an illuminating device therein and simple structure.

BACKGROUND OF THE INVENTION

As more people participate in outdoor leisure activities (such as mountain climbing and camping), there has been a proportionate increase in the demand for magnetic compasses. A conventional magnetic compass, such as that in U.S. Pat. No. 6,145,209, consists of numerous structural components and requires complicated and, furthermore, precise assembly to complete, with the objective of achieving reading accuracy through a biconvex lens that magnifies compass rose graduations. In addition to utilization by the average layman in leisure activities, such magnetic compasses are used for military applications and issued to soldiers.

Another type of magnetic compass, such as that in U.S. Design No. D369,982, has an aiming plate, scaling ruler, and other map-reading compass features for ascertaining position and distance.

Although the above two magnetic compasses are utilized by people for leisure activities, the magnetic compass disclosed by U.S. Pat. No. 6,145,209 has an inordinate number of structural components and is highly difficult to produce, it has a higher price that is not readily accepted by consumers. Although the magnetic compass taught by U.S. Design No. D369,982 has a scaling ruler and is capable of measuring actual distances on maps, most people do not understand how to use it and cannot take advantage of all the functions; the magnetic compass is also more expensive because it utilizes a large quantity of acrylic material. In addition, the magnetic compasses are of greater dimensions and weight, making them inconvenient to carry and, as a result, the magnetic compasses are not in widespread use among consumers.

Furthermore, to facilitate nighttime use, U.S. Pat. No. 6,145,209 discloses a lighting member situated on the bottom section of a mounting plate and since the light source is directed upward from the bottom section, light penetrates the compass rose disposed on the mounting plate to illuminate the graduations of the compass rose, thereby allowing the user to take readings. The drawback of such a design is that since the light source is projected from the bottom section of the compass rose, the projected light produces a diminutive bright spot that only illuminates a limited portion of the compass rose, which does not result in the most optimal illumination of the compass rose. Furthermore, since the illuminating device has numerous structural components and assembly is complicated, the production cost and retail price of the magnetic compass is significantly higher, a factor that inhibits consumer purchasing.

SUMMARY OF THE INVENTION

The primary objective of the present invention is to provide a magnetic compass, which has fewer structural components as well as a lower production cost and is easier to assemble.

Another objective of the invention herein to provide a magnetic compass having an illuminating device, which enhances the utility of the compass in dark.

To achieve the objectives above, the present invention provides a magnetic compass comprising a compass body having a housing and a magnetic needle situated inside the housing, an illuminant, a battery set, a base, a cover, a push button and a top lid. The base is provided with a base body having an internally formed recessed space, a battery compartment, and an illumination component chamber, wherein the compass body is situated within the recessed space. The battery compartment is disposed at one side of the recessed space and adapted to receive the battery set. The illumination component chamber is contiguous to the recessed space and the illuminant is positioned in the illumination component chamber such that its rays of emitted light are projected towards the peripheral walls of the compass body and, furthermore, the illuminant is connected to the battery set. In addition, an opening is formed at the top section of the base body that is contiguous with the recessed space and which is utilized to place the compass body into the recessed space. The opening of the base body is sealed by the cover. The cover is provided with a readout window and a push button hole corresponding in location to said compass body and said battery set. The push button is positioned in the battery compartment and, furthermore, its top portion protrudes through the push button hole of the cover. Pressing the push button establishes continuity between the battery set and the illuminant, enabling electrical current from the battery set to be supplied to the illuminant. The top lid is pivoted to one end of the base that folds down over the top surface of the base. In addition, the top lid is provided with a magnifying glass.

DETAILED DESCRIPTION OF THE INVENTION

Figure 1:
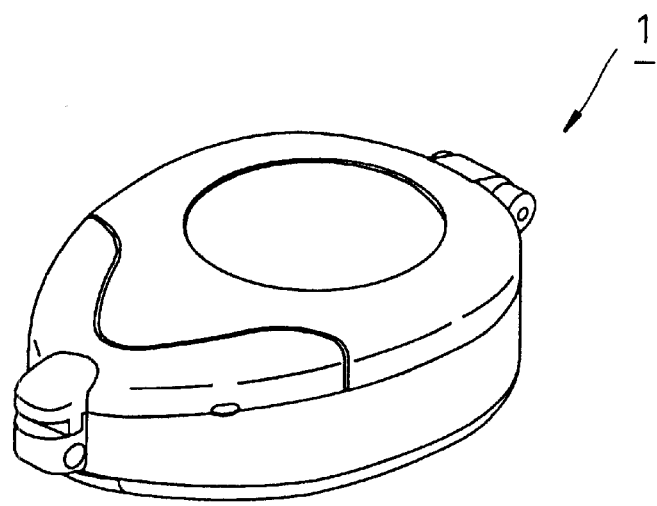
FIG. 1 is a perspective view of a preferred embodiment of the present invention.
Figure 3:
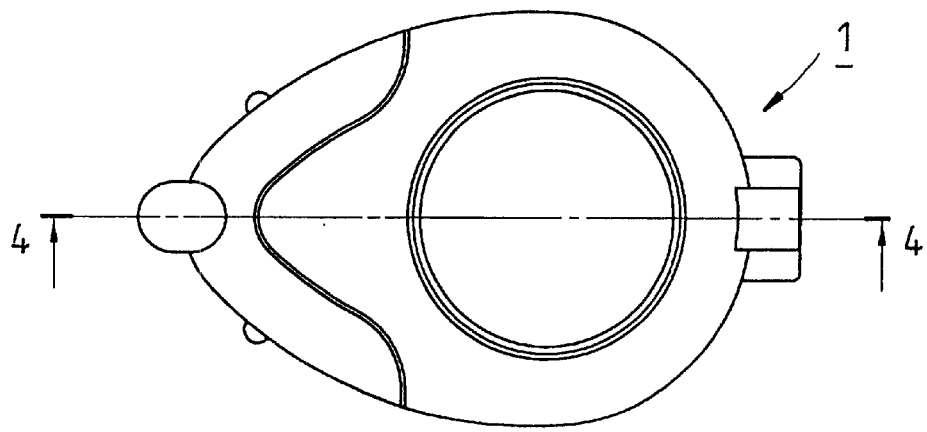
FIG. 3 is a top view of the preferred embodiment of the present invention.
Figure 2:
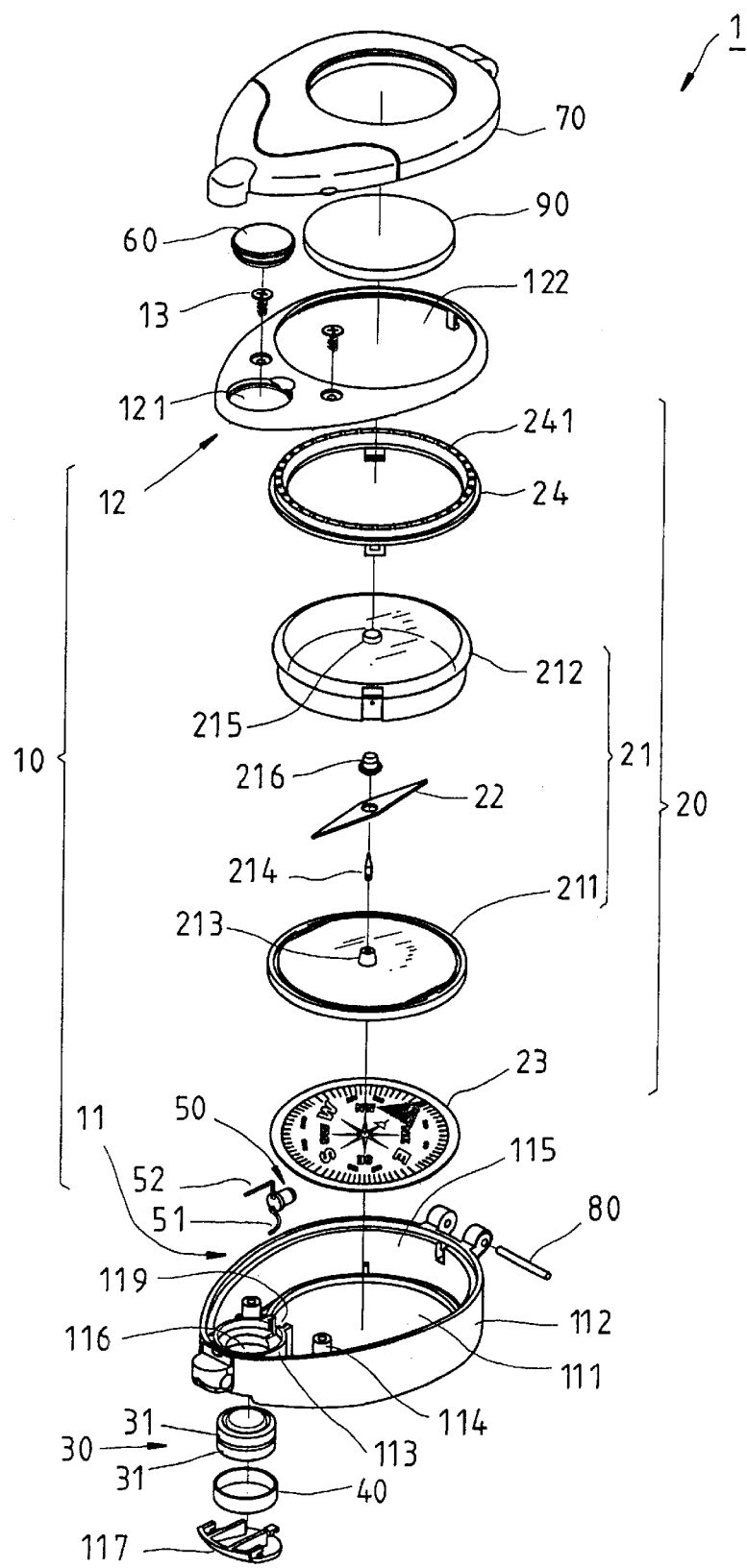
FIG. 2 is an exploded view of the preferred embodiment of the present invention.
Figure 4:
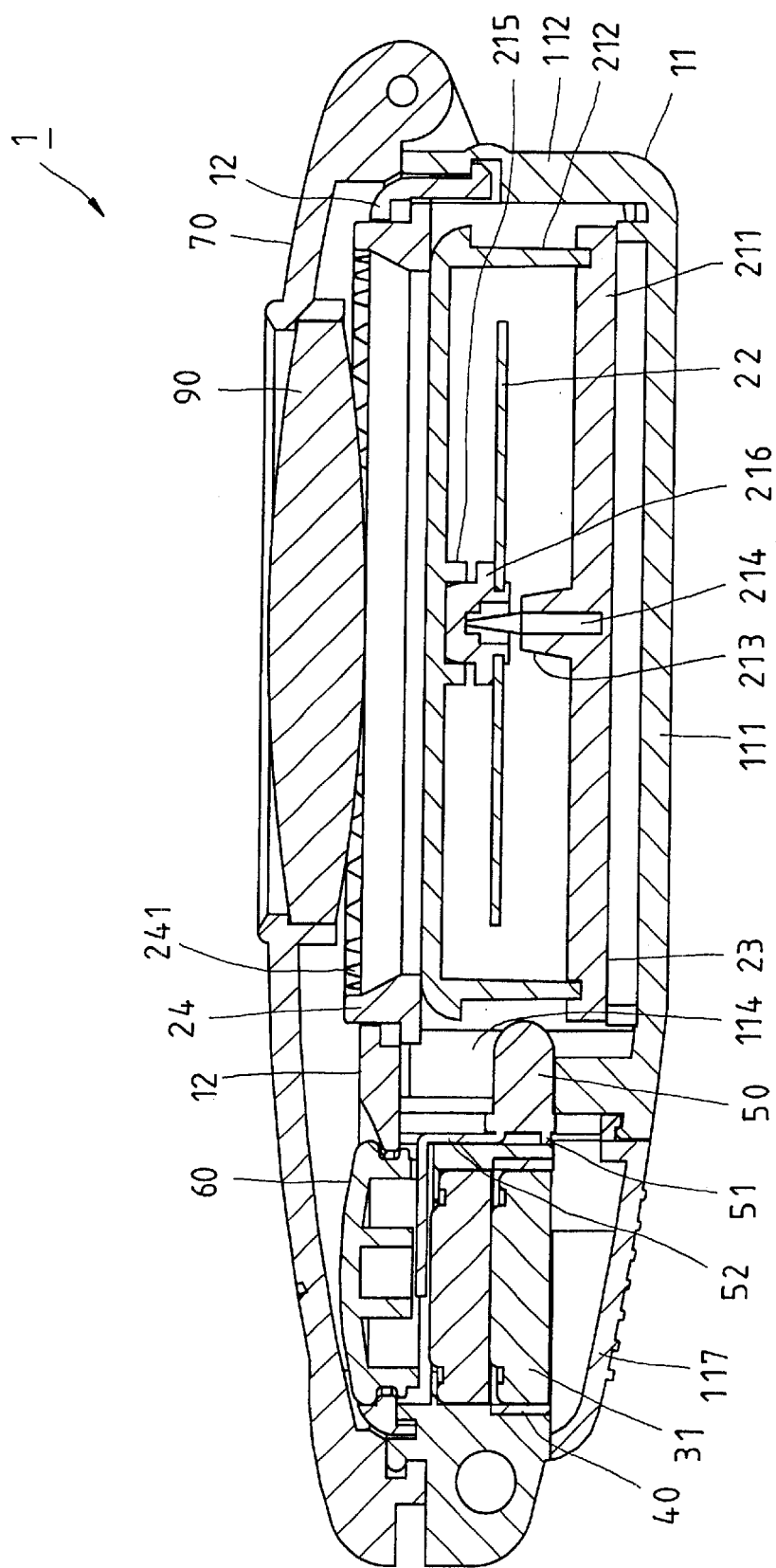
FIG. 4 is a sectional view tacked along a line 4—4 as shown in FIG. 3.

As shown in FIGS. 1–4, the magnetic compass 1 of a preferred embodiment of the present invention comprises basically a base 10, a compass body 20, a battery set 30, a conductive copper ring 40, an illuminant 50, a push button 60, a top lid 70.

The base 10 is provided with a base body 11 and a cover 12, of which:

The base body 11 has a bottom plate 111, a surrounding plate 112 disposed along the circumference of the bottom plate 111 and, furthermore, conjoined perpendicularly to the bottom plate 111, a tubular partition plate 113 situated within the circumferential periphery of the surrounding plate 112 and, furthermore, partially conjoined to the surrounding plate 112, and two mounting posts 114 projecting a certain height from the top surface of the bottom plate 111. A recessed space 115 is defined within the confines of the bottom plate 111 and the surrounding plate 112 and, furthermore, a circular opening is formed along the top margin of the bottom plate 111 that is contiguous with the recessed space 115; the area delimited by the partition plate 113 forms a battery compartment 116 situated at one side of the recessed space 115, with a receptacle formed through the bottom of the battery compartment 116 for placing batteries into the battery compartment 116 and, furthermore, a hatch 117 seals the receptacle. Additionally, a threaded hole 118 is tapped into the upper extent of each of the two mounting posts 114 and an illumination component chamber 119 is situated on the partition plate 113, with the illumination component chamber 119 contiguous to both the recessed space 115 and the battery compartment 116.

The cover 12 is sealed onto the opening of the base body 11 by respectively fastening two screws 13 into the two threaded holes 118 of the two mounting posts 114. The cover 12 is provided with a push button hole 121 and a readout window 122 corresponding in location to the battery compartment 116 and the recessed space 115 respectively.

The compass body 20 is comprised of a housing 21, a magnetic needle 22, a compass rose 23, and a decorative ring 24. The housing 21 consists of a transparent round housing bottom 211 sealed onto a transparent tubular housing body 212. The housing bottom 211 has a bearing mount 213 projecting from the center of its top surface that provides for the insertion of a pivot bearing 214. The housing body 212 has a mounting seat 215 formed at the center of its interior surface for receiving a retaining component 216. The magnetic needle 22 is a lengthy pointed member, the physical center at the underside of which is supported on the pivot bearing 214 such that it is capable of rotating freely on the pivot bearing 214 and, since it is influenced by the force of the earth's magnetic field, its two extremities respectively point in the direction of the north and south poles to achieve magnetic compass functions. The retaining component 216 presses the top center section of the magnetic needle 22 so as to prevent the dislodging of the magnetic needle 22 from the pivot bearing 214. In addition, the housing 21 is filled with a liquid that minimizes excessive oscillation during the rotation of the magnetic needle 22. The compass rose 23 is adhesively attached to the bottom section of the housing 21 and its top surface is inscribed with 360 incrementally numbered radiating graduations, with the characters N, E, W, and S labeled every 90 graduations. Since the housing bottom 211 is constructed of a transparent material, the graduations, numbers and characters on the top surface of the compass rose 23 are viewable from the upper extent of the housing 21. The decorative ring 24 is conjoined to the outer circumference along the top edge of the housing body 212 and a plurality of ridges 241 are formed on its annular surface to enhance appearance.

The compass body 20 is placed through the opening of the base body 11 into the recessed space 115 of the base body 11 and its bottom section is adhesively attached to the bottom plate 111 of the base body 11, thereby fixing the compass body 20 within the recessed space 115 of the base body 11.

The battery set 30 is consisted of two flat cylindrical lithium batteries 31 which are stacked one by one and placed into the battery compartment 116 of the base body 11.

The conductive copper ring 40 is placed into the battery compartment 116 and utilized to hold the respectively connected two lithium batteries 31 and conduct current from the two lithium batteries 31.

According to this embodiment, the illuminant 50 is a light-emitting diode (LED). The illuminant 50 is placed into the illumination component chamber 119, with the light-emitting head facing the peripheral walls of the compass body 20 such that the rays of light emitted are projected towards the peripheral walls of the compass body 20. The illuminant 50 is provided with two electric current input terminals, that is, a positive terminal 51 and a negative terminal 52. The positive terminal 51 in continuity with the conductive copper ring 40. The negative terminal 52 is disposed at an area between the positive end of the battery set 30 and the bottom section of the push button 60.

The push button 60 is positioned in the battery compartment 116 with its bottom section against the negative terminal 52 of the illuminant 50 and such that its top portion protrudes outside the push button hole 121 of the cover section 12. Pressing the push button 60 impels the negative terminal 52 of the illuminant 50 to contact the negative end of the battery set 30, causing electrical continuity between the illuminant 50 and the battery set 30 to thereby power the illuminant 50.

The top lid 70 is pivoted to one end of the base 10 by means of a hinge shaft 80 such that the top lid 70 folds down over the top surface of the base 10 and thereby protects the compass body 20 from external impact. It can also be folded up off the top surface of the base 10 to allow reading information from the compass body 20. In addition, the top lid 70 is provided with a magnifying glass 90.

Figure 5:
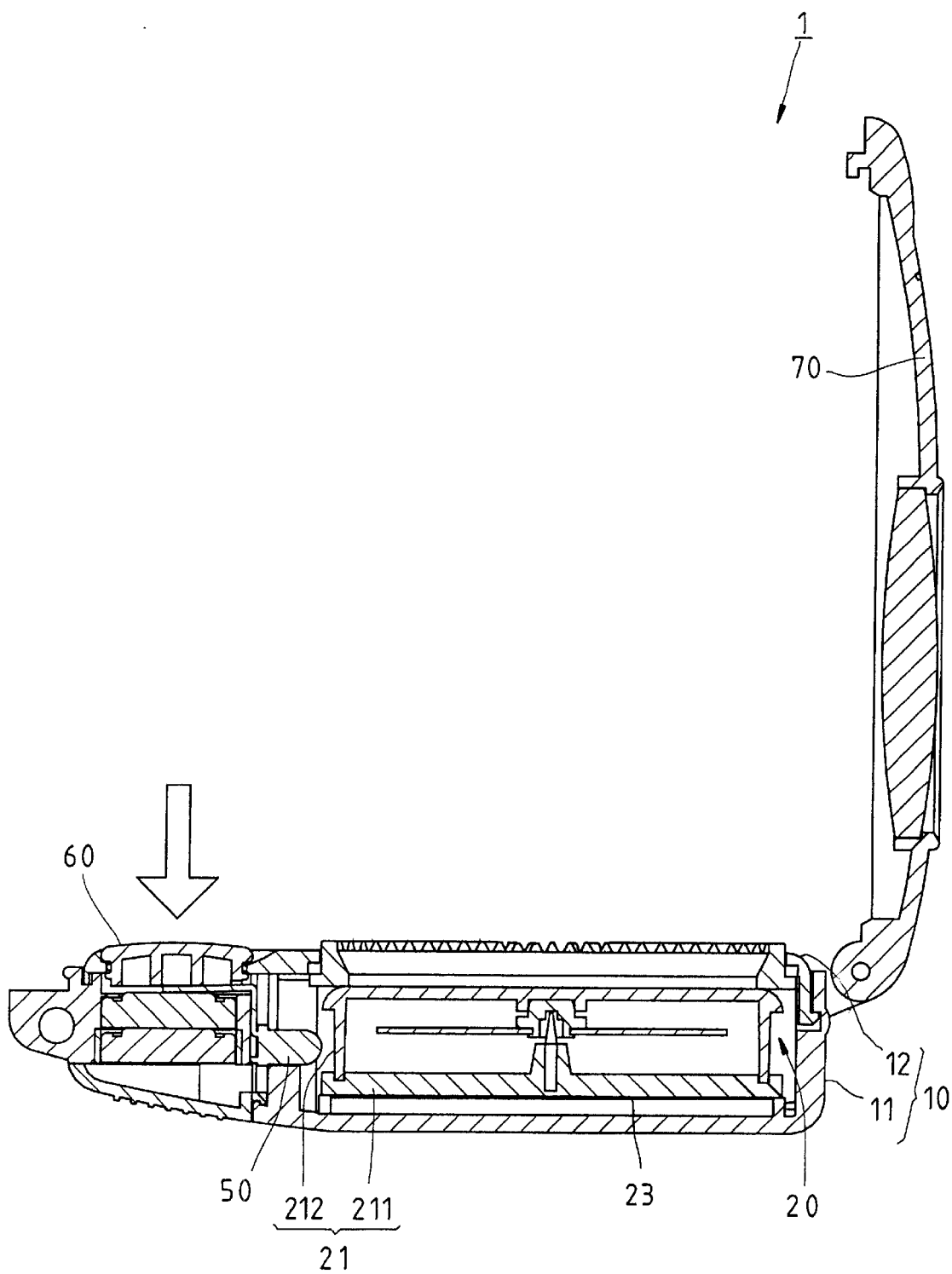
FIG. 5 is a sectional view of the preferred embodiment of the present invention illustrating the operation of the present invention.

Referring to FIG.5, when the magnetic compass 1 is in operation, the top lid 70 is first folded away from the top surface of the base 10, following which the user glances through the readout window 122 of the cover 12 to see the directional information from the compass body 20 and since reading the directional information indicated by magnetic compass needle is commonly known, this aspect shall not be further elaborated.

If the user utilizes the magnetic compass 1 at night or in low light conditions, pressing down the push button 60 causes the illuminant 50 to emit light rays towards the peripheral walls of the compass body 20 and since the housing 21 of the compass body 20 is fabricated out of a transparent material, the light emitted by the illuminant 50 illuminates the magnetic needle 22 and the compass rose 23 of the compass body 20 so that the user can read the direction and, furthermore, due to light ray diffraction principles, the radiance of the illuminant 50 highlights a broader area for optimal illumination.

Figure 6:
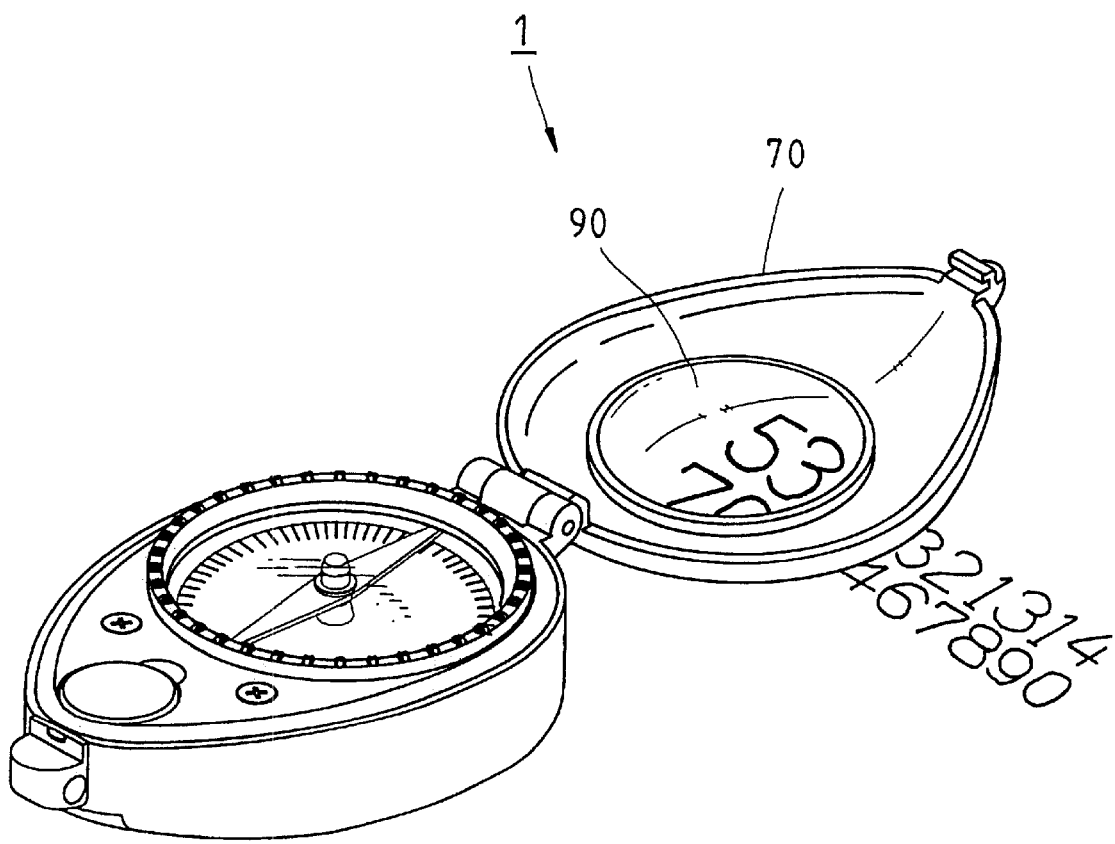
FIG. 6 is a perspective view of the preferred embodiment of the present invention showing the operation of the present invention.

Referring to FIG. 6, in addition to the graduated directional information and illumination capabilities, the magnifying glass 90 of the top lid 70 can be utilized by the user to magnify small objects (such as tiny organisms) or compass-related information (such as the smaller print and indications on maps), thereby facilitating the examination of minute objects or the reading of fine details by the user.

Given the structure of the magnetic compass 1 constituting the most preferred embodiment of the invention herein as well as the elaboration of its utilization, the advantages of the magnetic compass 1 are as follows:

1. Since the magnetic compass 1 requires less structural components, is of a straightforward structure and, furthermore, is easy to fabricate, its production cost is lower, resulting in a price that is acceptable to a broader spectrum of consumers and a product that is suitable for outdoor leisure activity applications.

2. Since the magnetic compass 1 has an illuminant 50 that is situated at the lateral aspect of the compass body 20 and, furthermore, its light source is projected from the lateral aspect of the compass body 20, its illumination efficiency is effectively optimized, thereby facilitating the reading of information from the compass body 20 by the user in areas of poor illumination, which is among the technological features of the present invention.

3. Since the magnetic compass 1 has a push button 60 that is positioned at the top portion of the base body 11, the operation is easier.

What is claimed is:

1. A magnetic compass comprising:
   a compass body having a transparent housing, magnetic needle installed inside said housing and a compass rose fixed to a bottom plate the transparent housing;
   an illuminant;
   a battery set connected electrically to said illuminant;
   a base having:
      a base body provided in the interior thereof with a recessed space receiving said compass body, a tubular partition plate forming a battery compartment on a periphery of said recessed space receiving said battery set, and an illumination component chamber communicated with said recessed space receiving said illuminant formed on said partition plate, said chamber and illuminant being spaced above the compass rose such that emitted light of said illuminant is projected towards the peripheral walls of the compass body and over the compass rose; an opening formed at the top section of the base body and communicated with said recessed space admitting said the compass body;
      a cover fixed over said opening of the base body, said cover is provided with a readout window and a push button hole corresponding in location to said compass body and said battery set;
      a push button positioned in said battery compartment and a top portion thereof, protruding through the push button hole of the cover, thereby pressing the push button establishes continuity between the battery set and the illuminant, enabling electrical current from the battery set to be supplied to the illuminant;
      a top lid pivoted to one end of said base and adapted to cover the top surface of said base, said top lid is provided with a built-in magnifying glass.

2. The magnetic compass as defined in claim 1, wherein the base is provided with the bottom plate, a surrounding plate disposed along the circumference of the bottom plate and conjoined perpendicularly to the bottom plate, and the tubular partition plate situated within the circular periphery of the surrounding plate and partially conjoined to the surrounding plate; said recessed space is defined within the confines of the bottom plate and the surrounding plate, and said opening is defined at a top margin of the bottom plate; an area delimited by the partition plate forms said battery compartment and said illumination component chamber is communicated with both said recessed space and said battery compartment.

3. The magnetic compass as defined in claim 2, wherein said base body is further provided with two mounting posts projecting a certain height from a top surface of the bottom plate and a threaded hole is tapped into an upper extent of each of the two mounting posts; said cover section fixed over said opening of said base by respectively fastening two screws into said two threaded holes of said two mounting posts.

4. The magnetic compass as defined in claim 1, wherein a receptacle is formed through the bottom of the battery compartment for placing the battery set into the battery compartment and a hatch seals the receptacle.

5. The magnetic compass as defined in claim 1, wherein said housing of the compass body is formed of a round housing bottom sealed onto a tubular housing body; said housing bottom has a bearing mount projecting from the center of its top surface that provides for the insertion of a pivot bearing; said housing body has a mounting seat formed at a center of an interior surface thereof for receiving a retaining component; said magnetic needle is a lengthy pointed member, a physical center at an underside thereof which is supported on the pivot bearing to permit rotation freely on the pivot bearing so that two extremities thereof respectively point in a direction of the north and south poles to achieve magnetic compass functions.

6. The magnetic compass as defined in claim 1, wherein the housing is filled with a high density liquid.

7. The magnetic compass as defined in claim 5, wherein said housing body and said housing bottom are both constructed of a transparent material; said compass body further comprises the compass rose which is adhesively attached to a bottom surface of the bottom plate of the housing and has a top surface inscribed with 360 incrementally numbered radiating graduations, with characters N, E, W, and S labeled every 90 graduations; since the housing bottom is constructed of a transparent material, the graduations, numbers and characters on the top surface of the compass rose are viewable from an upper extent of the housing.

8. The magnetic compass as defined in claim 5, wherein compass body further comprises a decorative ring that is conjoined to an outer circumference along a top edge of the housing body, and a plurality of ridges are formed on an annular surface of said decorative ring to enhance appearance.

9. The magnetic compass as defined in claim 1, wherein said battery set is formed of two flat cylindrical lithium batteries which are stacked one by one into said battery compartment.

10. The magnetic compass as defined in claim 1 further comprising a conductive copper ring that is placed into said battery compartment and connected with said two lithium batteries to conduct current from the two batteries.

11. The magnetic compass as defined in claim 10, wherein said illuminant is a light-emitting diode which is placed into the illumination component chamber facing peripheral walls of the compass body so that the emitted light of the illuminant is projected towards the peripheral walls of the compass body; said illuminant being provided with a positive terminal connected to said conductive cooper ring and a negative terminal disposed at an area between a negative end of the battery set and a bottom section of the push button;

said push button being positioned with a bottom section thereof against the negative terminal of the illuminant such that a top portion protrudes outside the push button hole of the cover, thereby pressing the push button impels the negative terminal of the illuminant to contact the negative end of the battery set, causing electrical continuity between the illuminant and the battery set to thereby power the illuminant.

* * * * *